United States Patent
Lee et al.

(10) Patent No.: US 10,484,195 B2
(45) Date of Patent: *Nov. 19, 2019

(54) METHOD AND APPARATUS FOR SHARING FUNCTIONS BETWEEN DEVICES VIA A NETWORK

(71) Applicant: Samsung Electronics Co., Ltd., Gyeonggi-do (KR)

(72) Inventors: Keum-koo Lee, Gyeonggi-do (KR); Hee-jeong Choo, Gyeonggi-do (KR); Ju-yun Sung, Gyeonggi-do (KR); Ji-young Kwahk, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 50 days.

This patent is subject to a terminal disclaimer.

(21) Appl. No.: 15/490,330

(22) Filed: Apr. 18, 2017

(65) Prior Publication Data

US 2017/0222826 A1    Aug. 3, 2017

Related U.S. Application Data

(63) Continuation of application No. 12/862,434, filed on Aug. 24, 2010, now Pat. No. 9,634,854.

(30) Foreign Application Priority Data

Aug. 24, 2009    (KR) .................. 10-2009-0078439

(51) Int. Cl.
  *H04L 29/06*    (2006.01)
  *H04L 29/08*    (2006.01)
  *H04L 12/28*    (2006.01)

(52) U.S. Cl.
  CPC ...... *H04L 12/2809* (2013.01); *H04L 65/1059* (2013.01); *H04L 65/605* (2013.01);
  (Continued)

(58) Field of Classification Search
  CPC ... H04L 67/2823; H04L 67/28; H04L 67/303; H04L 65/605; H04L 65/1059; H04L 65/80; H04L 69/24
  See application file for complete search history.

(56) References Cited

U.S. PATENT DOCUMENTS 7,185,056 B2    2/2007  Fujlsawa et al.
8,788,567 B2    7/2014  Sakai et al.
(Continued)

FOREIGN PATENT DOCUMENTS

CN    101218797    7/2008
JP    2004-348455    12/2004
(Continued)

OTHER PUBLICATIONS

Samsung Electronics Co., Ltd.: Open Service Gateway Initiative (OSGI): "RFP-101: OSGI Service Platform as a UPnP Device", Oct. 12, 2007.

(Continued)

*Primary Examiner* — Asghar H Bilgrami
(74) *Attorney, Agent, or Firm* — The Farrell Law Firm, P.C.

(57) ABSTRACT

A method of sharing a function via a network includes providing, to a first device, a device list including identification of a second device having a shared function which the first device is unable to perform, transmitting a response to the first device for authorizing a linkage with the first device, receiving multimedia content which is unplayable by the first device via the linkage, processing the multimedia content with the shared function to enable the first device to play the multimedia content, and transmitting result data comprising the processed multimedia content to the first device via the linkage.

12 Claims, 6 Drawing Sheets

(52) U.S. Cl.
 CPC .............. *H04L 65/80* (2013.01); *H04L 67/28* (2013.01); *H04L 67/2823* (2013.01); *H04L 67/303* (2013.01); *H04L 69/24* (2013.01); *H04L 2012/2849* (2013.01)

(56) References Cited

U.S. PATENT DOCUMENTS

| | | | |
|---|---|---|---|
| 9,032,097 B2* | 5/2015 | Albanese | G06F 21/33 709/246 |
| 9,326,016 B2* | 4/2016 | Grasset | G11B 27/034 |
| 2002/0091848 A1 | 7/2002 | Agresta et al. | |
| 2002/0129097 A1 | 9/2002 | Jia | |
| 2005/0198282 A1 | 9/2005 | Stahl et al. | |
| 2006/0117120 A1 | 6/2006 | Takagi | |
| 2006/0227864 A1 | 10/2006 | Miyamoto | |
| 2007/0067456 A1 | 3/2007 | Ko | |
| 2007/0237115 A1* | 10/2007 | Bae | H04L 12/2834 370/331 |
| 2007/0238471 A1 | 10/2007 | Bae et al. | |
| 2007/0294372 A1* | 12/2007 | Hlasny | H04L 12/2803 709/219 |
| 2007/0294381 A1 | 12/2007 | Hong et al. | |
| 2008/0101764 A1* | 5/2008 | Johannesson | G11B 27/11 386/241 |
| 2008/0205419 A1 | 8/2008 | Shin et al. | |
| 2009/0067441 A1* | 3/2009 | Ansari | H04L 12/2814 370/401 |
| 2009/0100492 A1* | 4/2009 | Hicks, III | H04L 12/2825 725/127 |
| 2009/0150520 A1 | 6/2009 | Garcia et al. | |
| 2009/0150570 A1 | 6/2009 | Tao et al. | |
| 2009/0165053 A1* | 6/2009 | Thyagarajan | H04N 5/44543 725/46 |
| 2009/0235170 A1 | 9/2009 | Golden | |
| 2010/0095332 A1* | 4/2010 | Gran | H04N 21/4122 725/93 |
| 2010/0306411 A1 | 12/2010 | Zhang | |
| 2011/0106736 A1* | 5/2011 | Aharonson | G06Q 10/109 706/12 |
| 2011/0106910 A1* | 5/2011 | Grasset | G11B 27/034 709/217 |
| 2012/0173739 A1* | 7/2012 | Stoyanov | H04L 65/4084 709/227 |
| 2012/0287034 A1 | 11/2012 | Park | |
| 2015/0237008 A1* | 8/2015 | Ansari | G06Q 30/04 726/1 |

FOREIGN PATENT DOCUMENTS

| | | |
|---|---|---|
| JP | 2005-529519 | 9/2005 |
| JP | 2006-157339 | 6/2006 |
| JP | 2006-244514 | 9/2006 |
| JP | 2007-215035 | 8/2007 |
| JP | 2009-146390 | 7/2009 |
| KR | 100765791 | 10/2007 |
| KR | 100789425 | 12/2007 |
| KR | 1020090042549 | 4/2009 |
| RU | 2002118610 | 3/2004 |
| WO | WO 2007/004754 | 1/2007 |
| WO | WO 2008/005671 | 1/2008 |
| WO | WO 2008/147099 | 12/2008 |

OTHER PUBLICATIONS

Ritchie et al.: "UPnP AV Architecture:1", Jun. 25, 2002.
Yaiche et al., "A Game Theoretic Framework for Bandwidth Allocation and Pricing in Broadband Networks", IEEE/ACM Transactions on Networking, vol. 8, No. 5, Oct. 2000.
Newman, "The Structure and Function of Complex Networks", Citeseer, 2003.
Finin et al., "KQML as an Agent Communication Language", ACM, 1994.
Canadian Office Action dated Jul. 16, 2013, issued in counterpart application No. 2,769,224.
Korean Office Action dated Apr. 27, 2015 issued in counterpart application No. 10-2009-0078439.

* cited by examiner

METHOD AND APPARATUS FOR SHARING FUNCTIONS BETWEEN DEVICES VIA A NETWORK

PRIORITY

This application is a Continuation Application of U.S. patent application Ser. No. 12/862,434, which was filed on Aug. 24, 2010, and claims priority under 35 U.S.C. 119 to Korean Patent Application No. 10-2009-0078439, which was filed in the Korean Intellectual Property Office on Aug. 24, 2009, the contents of each of which are incorporated herein by reference.

BACKGROUND OF THE INVENTION

1. Field of the Invention

The present invention relates to connections between devices for sharing functions via a network.

2. Description of the Related Art

Along with miniaturization of electronic devices and the development of networking technologies, the mobilization of electronic devices has significantly increased. However, since it is practically difficult for a mobile electronic device to include every necessary function, the mobile electronic device generally only includes the most frequently used functions related to the most important mobile electronic device uses.

SUMMARY OF THE INVENTION

The present invention provides a method and an apparatus for sharing functions between devices via a network.

According to an aspect of the present invention, a method of sharing a function between devices via a network includes providing, to a first device, a device list including identification of a second device having a shared function which the first device is unable to perform, from among at least one device connected to the network, transmitting, in response to a linking request by the first device, a response to the first device for authorizing a linkage with the first device, receiving multimedia content which is unplayable by the first device via the linkage, processing the multimedia content with the shared function to enable the first device to play the multimedia content, and transmitting result data comprising the processed multimedia content to the first device via the linkage.

According to another aspect of the present invention, an apparatus for sharing a function between devices via a network includes a transceiver configured to provide, to a first device, a device list including identification of the apparatus having a shared function which the first device is unable to perform, among at least one device connected to the network, to transmit, in response to a linking request by the first device, a response to the first device for authorizing a linkage with the first device, and to receive multimedia content which is unplayable by the first device via the linkage, and a processor configured to process the multimedia content with the shared function to enable the first device to play the multimedia content, wherein the transceiver is further configured to transmit result data comprising the processed multimedia content to the first device via the linkage.

According to another aspect of the present invention, disclosed is a non-transitory computer readable recording medium having recorded thereon a computer program for implementing a method of sharing a function between devices via a network, the method including providing, to a first device, a device list including identification of a second device having a shared function which the first device is unable to perform, from among at least one device connected to the network, transmitting, in response to a linking request by the first device, a response to the first device for authorizing a linkage with the first device, receiving multimedia content which is unplayable by the first device via the linkage, processing the multimedia content with the shared function to enable the first device to play the multimedia content, and transmitting result data comprising the processed multimedia content to the first device via the linkage.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE INVENTION

Figure 1:
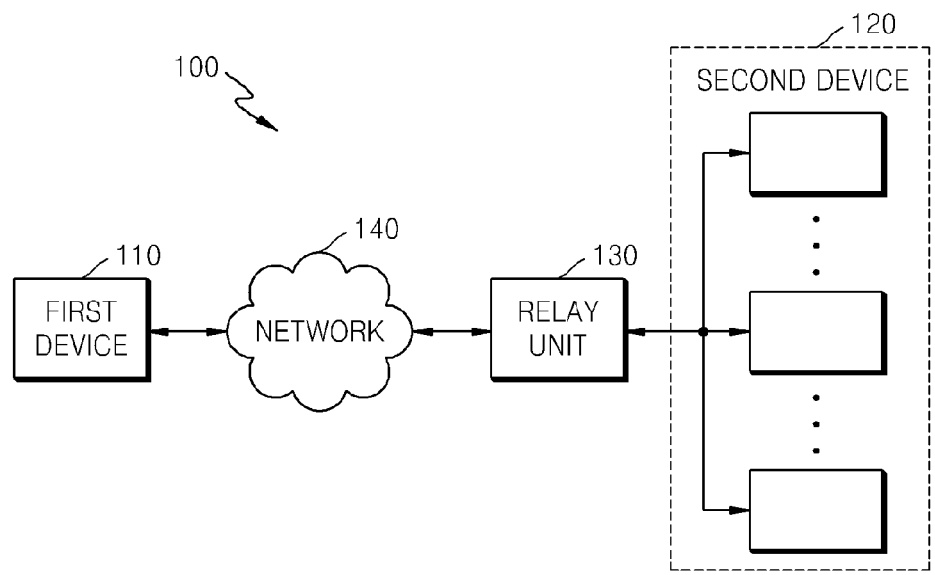
FIG. 1 illustrates a system for sharing functions between devices via a network according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

FIG. 1 illustrates a system 100 for sharing functions between devices via a network according to an embodiment of the present invention.

Referring to FIG. 1, the system 100 includes a first device 110 and a second device 120, which are connected to each other via a network 140. The system 100 may further include a relay unit 130 according to the type of the network 140.

The first device 110 refers to a device for requesting sharing of a function with respect to an external device (the second device 120), and examples thereof may include various types of devices supporting various types of wired/wireless network connections, such as a Portable Multimedia Player (PMP), an Ultra Mobile Personal Computer (UMPC), a laptop computer, a mobile phone, a digital camera, or a PC.

The second device 120 refers to a device for performing a shared function as requested by the first device 110 and may support various types of wired/wireless network connections. The second device 120 may be at least one of client devices connected to the relay unit 130, such as a home gateway or a home server, to constitute a home network system. For example, the second device 120 may be at least one of devices connected via a network 130 complying Digital Living Network Alliance (DLNA) standard, which is for controlling information electronic devices within a household, and sharing functions.

The second device 120 may also be at least one of devices constituting an Ad-Hoc network system. In this case, the relay unit 130 is not necessary, and one of devices constituting an Ad-Hoc system may be configured to function as a relay unit. Furthermore, the second device 120 may be at least one of devices constituting an infrastructure system connected to the relay unit 130, such as an Access Point (AP).

The relay unit 130 generates metadata including identification information, physical properties, functions, and performance of at least one of the second devices 120 connected to the relay unit 130 and manages the generated metadata as a device property list. When the second device 120 connected to the relay unit 130 is replaced or performance thereof is changed, the relay unit 130 detects such a change and updates the device property list. When a signal for searching for a device corresponding to a function is received from the first device 110 via the network 140, the relay unit 130 extracts information regarding devices corresponding to the function from the device property list with respect to the second devices 120 and transmits the extracted information to the first device 110 via the network 140.

Furthermore, when a signal for searching for a linkable device is received from the first device 110 via the network 140, the relay unit 130 may transmit the device property list, which includes information regarding all devices connected to the relay unit 130, to the first device 110 via the network 140. Alternatively, metadata including identification information, physical properties, functions, and performance of at least one of the second devices 120 may be generated and stored in the second devices 120 without introducing a separate relay component. In this case, when a signal for searching for a device corresponding to a function or a linkable device is received from the first device 110 via the network 140, information regarding a device corresponding to the function or information regarding a linkable device from among devices constituting the second devices 120 may be transmitted to the first device 110 via the network 140.

The network 140 includes both a Local Area Network (LAN) and Wide Area Network (WAN) and may include wireless connection protocols, such as Bluetooth®, Wi-Fi, WiBro, and Ultra WideBand (UWB), and wired connection protocols, such as Institute of Electrical and Electronics Engineers (IEEE) 1394 and Ethernet. For convenience of explanation, it is assumed herein that only one network 140 exists. However, a plurality of networks 140 may exist. In this case, at least one additional device (i.e. second device 120) may exist with respect to each of the networks 140.

Furthermore, the first device 110 may acquire information regarding sharable functions of the second devices 120 to confirm sharable functions of the second device 120. The first device 110 may either directly request information regarding sharable function to the second device 120 via the network or, when the second device 120 constitutes a home network system or an infrastructure system, request information regarding sharable function to the relay unit 130, such as a home server, a home gateway, or an Access Point (AP).

According to the present invention, when it is not possible for a mobile multimedia device to execute a function due to storage capacity and/or processing capability of the mobile multimedia device, multimedia content may be processed by using functions of an external device connected to the mobile multimedia device via a network and a result of processing the multimedia content may be transmitted to the mobile multimedia device. As a result, the mobile multimedia device may minimize functions integrated therein and provide optimal multimedia services demanded by a user.

Figure 2:
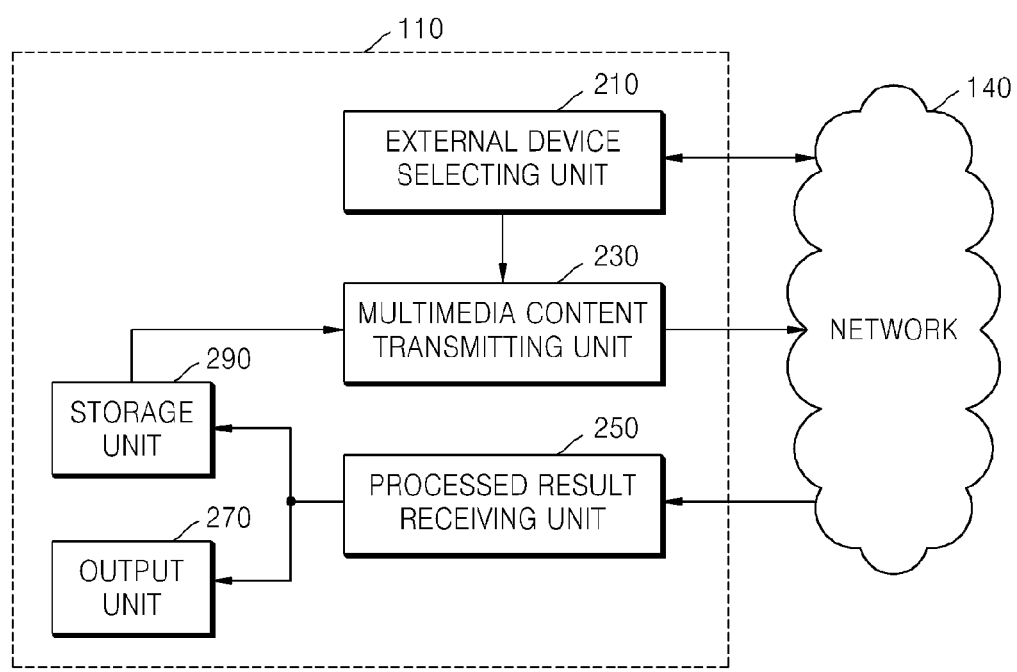
FIG. 2 illustrates a device requesting sharing of a function to an external device, according to an embodiment of the present invention.

FIG. 2 illustrates a device 200 for requesting sharing of a function to an external device, according to an embodiment of the present invention.

According to FIG. 2, the device 200 includes an external device-selecting unit 210, a multimedia content transmitting unit 230, a processed result receiving unit 250, an output unit 270, and a storage unit 290. The external device-selecting unit 210 may be embodied as a processor. The external device selecting unit 210 and the other components of the device 200 may be embodied as at least one processor. The device 200 requesting sharing of a function to the external device selecting unit 210 may correspond to the first device 110 shown in FIG. 1.

The external device selecting unit 210 may detect at least one linkable device from among devices of the network 140 connected to the first device 110 and may select the second device 120 to be linked from among the detected devices. The external device selecting unit 210 may detect at least one device capable of performing a function desired by the first device 110 from among devices of the network 140 connected to the first device 110 and may select the second device 120 to be linked from among the detected devices.

Furthermore, the external device selecting unit 210 may search for at least one device capable of performing a function desired by the first device 110 from among devices of the network 140 connected to the first device 110 and may select the second device 120 to be linked from among the searched devices. The external device-selecting unit 210 may refer to a device property list provided via the network 140. The external device-selecting unit 210 may transmit a signal for requesting link to the selected second device 120 and may receive a signal for authorizing link from the second device 120.

When the first device 110 is linked with the second device 120 via the network 140 by the external device selecting unit 210, the multimedia content transmitting unit 230 transmits identification information of the first device 110 and multimedia content stored in the storage unit 290 from the first device 110 to the second device 120. The multimedia content transmitting unit 230 converts multimedia content to be suitable for network connection.

For example, the multimedia content transmitting unit 230 recombines multimedia content to a User Datagram Protocol/Internet Protocol (UDP/IP) packet type Transport Stream (TS) and transmits the recombined TS to the second device 120 via the network 140. The multimedia content transmitting unit 230 may define the type of result data to be acquired by performing a shared function and include information defining the type of result data in the header of the TS. The second device 120, which has received the TS with respect to the multimedia content, may perform a function, which may not be directly performed by the first device 110 but may be performed by the second device 120, with respect to the TS. Although the subject of performing a shared function is the second device 120, the first device 110 may acquire result data generated by performing the shared function.

The processed result-receiving unit 250 receives result data generated by performing a shared function in the second device 120 via the network 140. The received result data corresponds to the type of data defined in the header of the TS by the multimedia content transmitting unit 230. The received result data may either be displayed by the output unit 270 or stored in the storage unit 290.

However, the first device 110 may modify configuration of a User Interface (UI) to execute a shared function of the second device 120. The first device 110 may display a selection menu for user input on the output unit 270. Other than a selection menu for existing functions, the output unit 270 may further display a new selection menu for selecting the second device 120 or a shared function of the second device 120. The output unit 270 may further display a selection menu for indicating a type of result data to be acquired by performing a shared function in the second device 120. When the first device 110 includes a touch screen, a user may manipulate a UI by touching the touch screen. When the first device 110 includes buttons, the user may manipulate the UI by manipulating the buttons.

Figure 3:
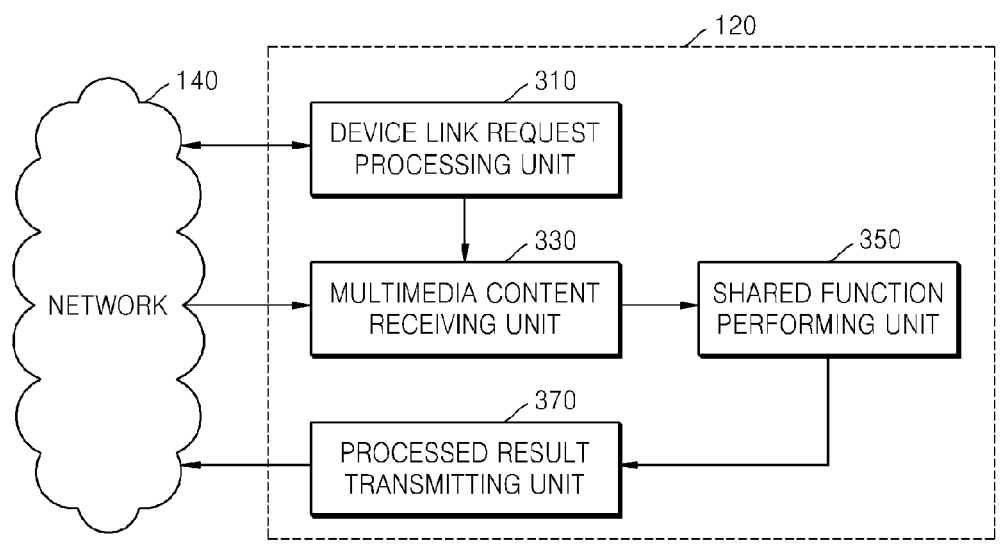
FIG. 3 illustrates a device for performing a requested shared function, according to an embodiment of the present invention.

FIG. 3 illustrates a device 300 for performing a requested shared function, according to an embodiment of the present invention.

The device 300 according to FIG. 3 includes a device link request processing unit 310, a multimedia content receiving unit 330, a shared function performing unit 350, and a processed result transmitting unit 370. The device link request processing unit 310 and the shared function performing unit 350 may be embodied as individual processors or as at least one processor together with the other components of the device 300. The device 300 for performing a requested shared function may correspond to the second device 120 shown in FIG. 1.

The device link request processing unit 310 receives a link request from the first device 110 connected via the network 140. The first device 110 detects at least one device connected to the first device 110 via the network 140 and requests link to the second device 120 selected from among the detected devices. The device link request processing unit 310 processes the link request from the first device 110, generates a signal for indicating link authorization, link standby, or link impossibility, and transmits the signal to the first device 110.

The first device 110 may directly select the second device 120 in reference to a device property list provided by the relay unit 130 and may request link. The first device 110 may also confirm functions that may be performed by the second device 120 in reference to a device property list provided by the relay unit 130 and may select the second device 120 as the target of link.

The second device 120 may provide such information regarding functions that may be performed by the second device 120 to the first device 110 in advance, or in response to a request from the first device 110. For example, the second device 120 may provide a device property list, which is metadata including identification information, physical properties, functions, and performance of at least one of the second device 120, to the first device 110 directly or via the relay unit 130.

When the first device 110 and the second device 120 are linked with each other, the multimedia content receiving unit 330 receives a TS of multimedia stream provided by the first device 110 via the network 140. The type of result data to be acquired by performing a shared function and identification information of the first device 110 may be defined in the header of the TS.

The shared function performing unit 350 performs a shared function, such as decoding or encoding, with respect to the received TS of multimedia stream. Decoding or encoding may be performed in correspondence to the type of result data to be acquired by performing a shared function as defined in the header of the TS. For example, if the type of result data to be acquired by performing a shared function corresponds to the type of playback screen, the shared function-performing unit 350 performs decoding and generates decoded data. However, if the type of result data to be acquired by performing a shared function corresponds to data encoded in a format different from that of the received data, the shared function-performing unit 350 performs encoding and generates encoded data in the different format.

The processed result-transmitting unit 370 transmits result data acquired by performing a shared function in the shared function performing unit 350 and identification information of the first device 110 via the network 140. In this regard, when the result data is decoded data or encoded data, the data may be transmitted using a streaming method.

Accordingly, since functions may be shared via the network 140, if a function may not be performed by the first device 110, the first device 110 may utilize the function of the second device 120, which is connected via the network 140.

Figure 4:
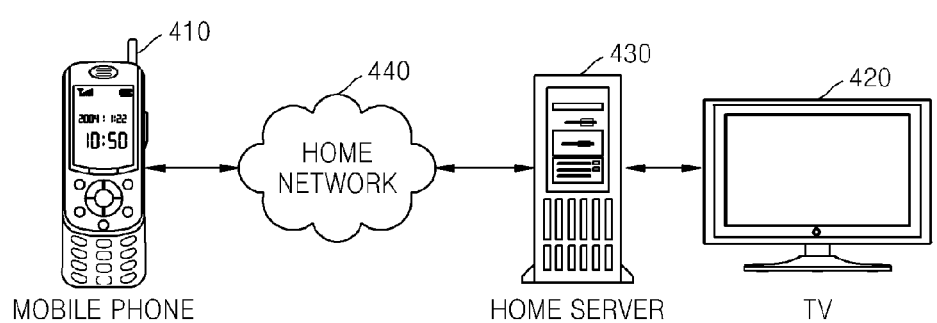
FIG. 4 illustrates a detailed example of a function sharing system according to an embodiment of the present invention.

FIG. 4 illustrates a detailed example of a function sharing system 400 according to an embodiment of the present invention.

Referring to FIG. 4, the function sharing system 400 includes a mobile phone 410, which is used as a first device requesting codec function, a playback device 420, which is used as a second device having codec function, a home server 430, which is used as a relay unit, and a home network 440.

The function sharing system 400 operates when the mobile phone 410 is unable to execute original multimedia content selected by a user. Examples of instances when the mobile phone 410 is unable to execute original multimedia content selected by the user include when the type of the original multimedia content file is not supported by the mobile phone 410, when it is difficult for the mobile phone 410 to process the multimedia content due to limits, such as calculation capability and battery life, when available storage capacity of the mobile phone 410 is insufficient for processing the multimedia content, when the mobile phone 410 is unable to process any multimedia content, and when a version of process at which the original multimedia content is processed and a version of process supported by the mobile phone 410 are different.

When the mobile phone 410 is connected to the home network 440 and detects the playback device 420 constituting the home network 440 via the home server 430, the mobile phone 410 is linked with the playback device 420 via the home network 440. Although the mobile phone 410 may be linked to all detected devices at all times, a link between the mobile phone 410 and the playback device 420 may be controlled if required, as continuous link may cause excessive load in terms of processing amount and network traffic.

A user may control the operation of the mobile phone 410 detecting of devices connected to the network 440. For example, the playback device 420 for performing a function desired by the user may be searched by using the mobile phone 410 and the searched playback devices 420 may be displayed on the mobile phone 410. The mobile phone 410 may receive a device property list regarding physical properties, functions, and performance of each of the searched playback devices 420 from the home server 430 and may provide the device property list via a UI. The mobile phone 410 may determine whether to request link in reference to the device property list regarding the playback devices 420 provided via the UI.

When the mobile phone 410 requests link and the playback device 420 authorizes link, the mobile phone 410 is linked with the playback device 420 via the network 440. Multimedia content with respect to which a user selected to perform a shared function is provided from the mobile phone 410 to the playback device 420 via the network 440. The playback device 420 performs decoding or encoding with respect to the multimedia content in correspondence to the type of conversion designated by the mobile phone 410, such as the type of playback screen or format of the encoded data. Result data acquired by performing decoding or encoding is transmitted to the mobile phone 410, which has been requested to perform a shared function, via the network 440.

Multimedia content provided from the mobile phone 410 to the playback device 420 and result of data acquired by performing a requested shared function in the playback device 420 may be recombined to a TS and transmitted via the network 440. However, the present invention is not limited thereto.

FIGS. 5A through 5E illustrate examples of utilizing sharing of functions via a network according to an embodiment of the present invention.

The mobile phone 410 is a device that may be linked with the network 440 via Local Area Network (LAN) or Wide Area Network (WAN), and includes a codec for playback of multimedia content, such as a moving picture file. However, since the mobile phone 410 includes a codec for limited types of files, for example, the mobile phone 410 is unable recognize a moving picture file if the moving picture file is not a type of file that may be played back by the codec of the mobile phone 410. Therefore, referring to FIG. 5A, when an instruction to play a moving picture file, which is not a type of file that may be played back, is input, the mobile phone 410 displays a warning window 510, which informs that the moving picture file is not a type of file that may be played back, on the output unit 270.

The warning window 410 is a UI generated when the mobile phone 410 is unable to perform a function selected by a user. Examples of instances when the mobile phone 410 is unable to perform a function selected by a user include when it is difficult for the mobile phone 410 to process the multimedia content due to limits, such as calculation capability and battery life, when available storage capacity of the mobile phone 410 is insufficient for processing the multimedia content, when the mobile phone 410 is unable to process any multimedia content, and when a version of process at which the original multimedia content is processed and a version of process supported by the mobile phone 410 are different.

The mobile phone 410 is connected to the network 440. The network 440 is connected to the playback device 420. When the warning window 510 is displayed, referring now to FIG. 5B, the mobile phone 410 may automatically display the search window 530 either for searching for a device capable of transcoding or when a user selects a separate UI related to the search window 530. When the user requests via the search window 530 to search for a device capable of transcoding, a new menu for selecting a device property list related to transcoding may be generated and displayed on the UI.

Figure 5A:
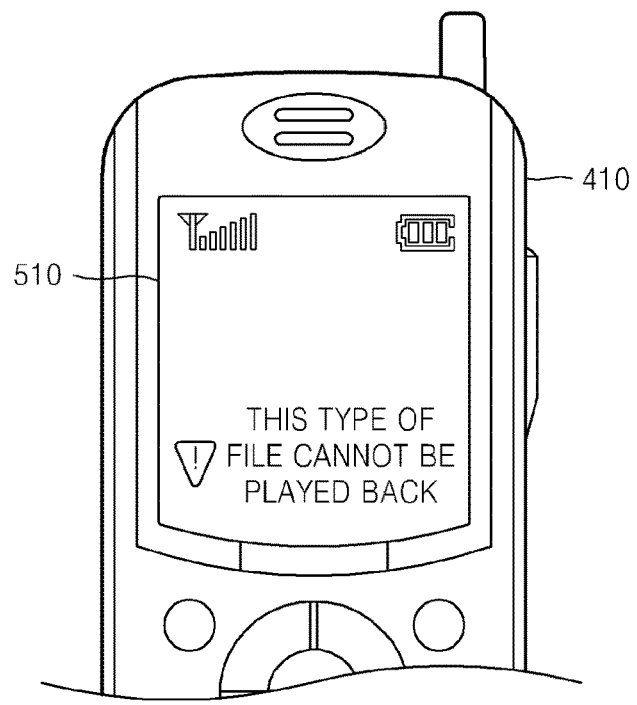
FIGS. 5A through 5E illustrate examples of utilizing sharing of functions via a network according to an embodiment of the present invention.
Figure 5B:
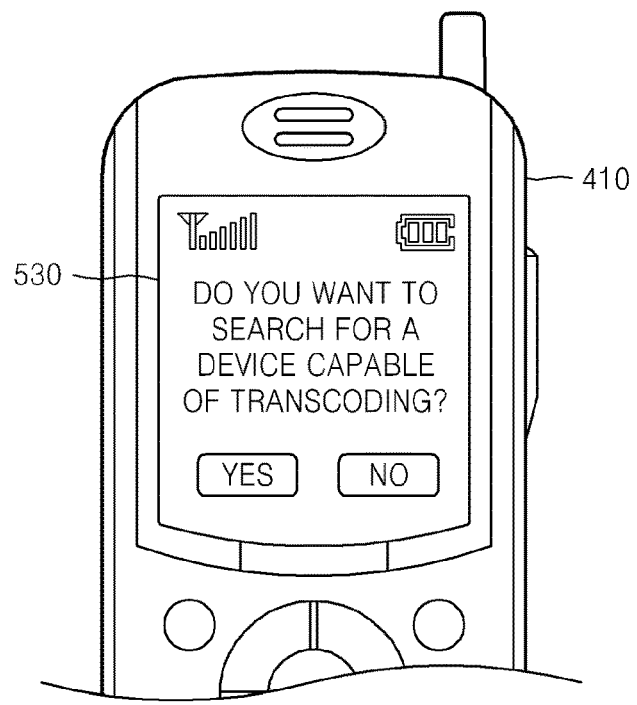
Figure 5C:
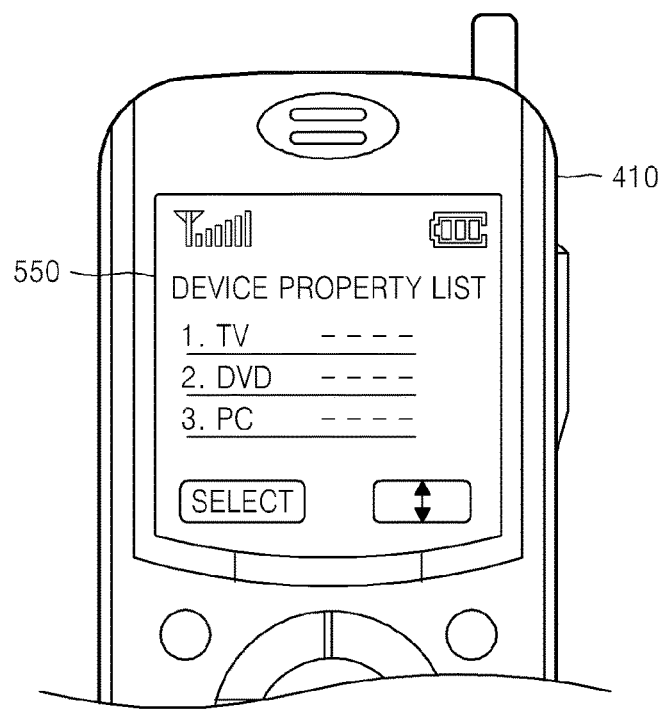

When a user requests via the search window 530 to search for a device capable of transcoding, referring now to FIG. 5C, an information window 550 showing a device property list with respect to at least one playback device 420 existing in the network 440 connected to the mobile phone 410 is displayed. The device property list of the information window 550 may include physical properties, functions, and performance of each of the playback devices 420. For example, functions of the playback device 420 may include various types of video and audio codecs, that is, types of convertible files, where information regarding video codecs may include information about data rates, frame rates, sizes, and I frame intervals, and information regarding audio codec may include information about sampling rates, bit rates, and channels. The playback devices 420 are displayed on the information window 550 in the order closest to property information selected by a user in a menu for selecting device property information related to transcoding. The user selects one of at least one playback devices 420 displayed on the information windows 550.

Figure 5D:
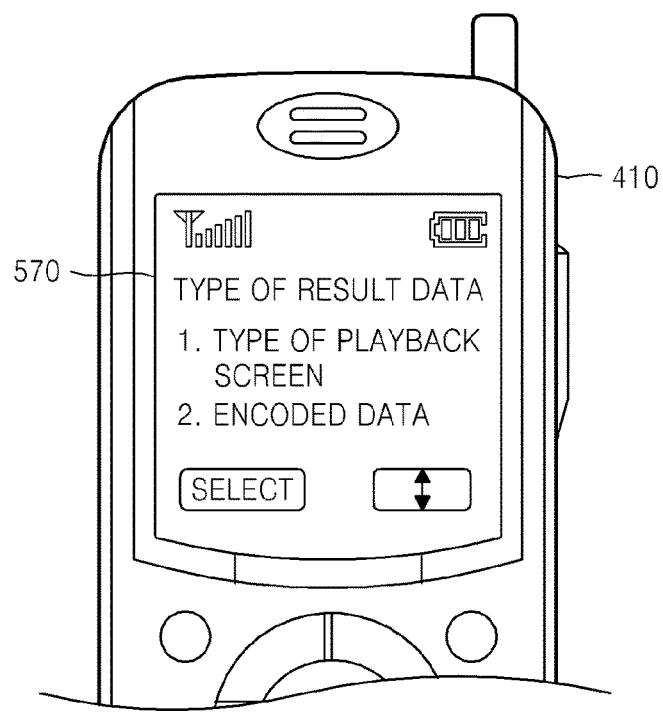

Referring to FIG. 5D, although it is not necessary to display an information window 570 for selecting a type of result data when a default type of result data to be acquired by performing a shared function in the playback device 420 is defined, if at least two types of result data are needed (such as data of different types of playback screen or encoded in different formats), the information window 570 for selecting a type of result data is displayed. When a user selects types of result data in the information window 570, a moving picture file is converted to a type of result data that may be transmitted via the network 440, information indicating types of result data is added to the header of the converted data, and the converted data is transmitted. An example of types of result data that may be transmitted via the network 440 may include a TS.

Figure 5E:
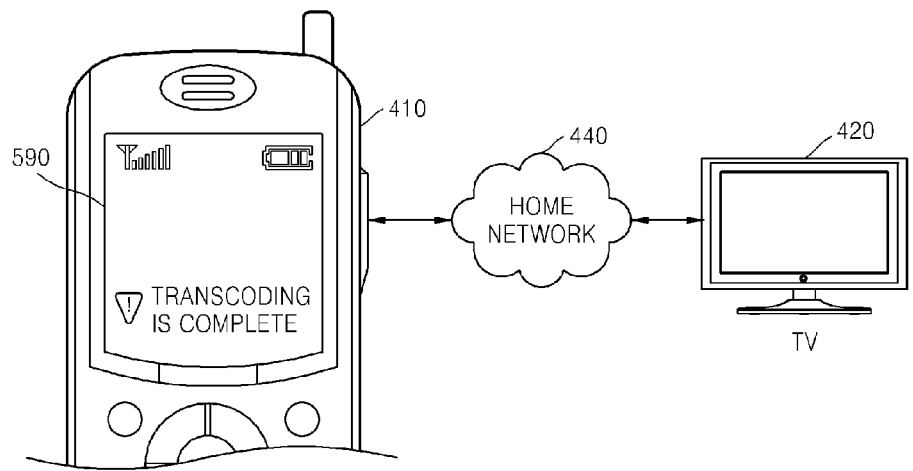

The playback device 420 performs a shared function, such as transcoding, with respect to the converted data, transmitted via the network 440, in correspondence to the types of result data and transmits transcoded result data to the mobile phone 410 via the network 440. When the result data is received, the mobile phone 410 displays an information window 590 for informing completion of transcoding, as illustrated in FIG. 5E.

Figure 6:
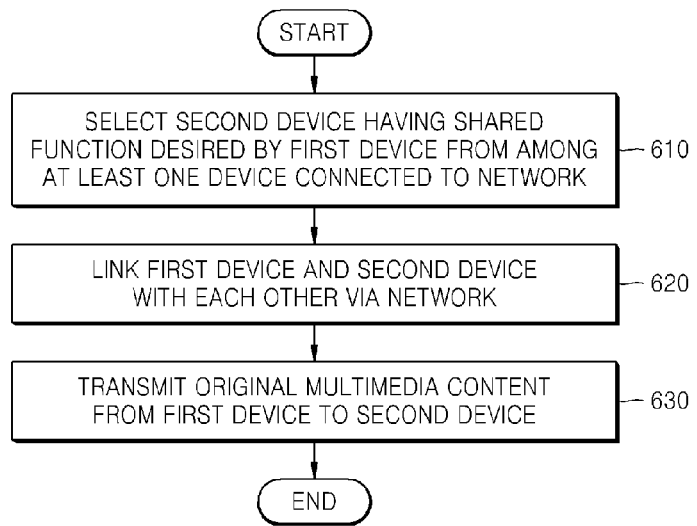
FIG. 6 illustrates a method of requesting sharing of a function to an external device, from among methods of sharing functions via a network according to an embodiment of the present invention.

FIG. 6 illustrates a method of requesting sharing of a function to an external device, from among methods of sharing functions via a network according to an embodiment of the present invention.

In an operation 610, a second device having a shared function desired by a first device is selected from among at least one device connected to a network. To select the second device, it is determined with respect to the at least one device connected to the network whether the at least one device connected to the network has a shared function desired by the first device, and one of devices determined as devices having the shared function is selected.

Specifically, when the first device searches for a device having a shared function desired by the first device from the among at least one device connected to the network, a device property list, which is metadata including physical properties, functions, and performance of each device connected to the network, is provided to the first device via the network, and the first device selects the second device having a shared function desired by the first device with reference to the device property list. A relay device may be arranged between each device connected to the network. The relay device may generate or update a device property list with respect to each device and may provide the device property list to the first device when the first device requests the device property list. When the first device sets up detailed options related to a shared function desired by the first device, the relay device may extract a property list of a device closest to the detailed options and may provide the property list to the first device.

In an operation 630, the first device and the second device are linked with each other via the network. In detail, after the first device selects the second device, the first device requests link to the second device, and the second device authorizes the request when a corresponding shared function is currently not being performed. However, when the second device is turned off, the first device is informed that link is impossible. When a corresponding shared function is currently being performed in the second device, the first device is informed about an estimated time to elapse and is instructed to standby for link.

In an operation 650, original multimedia content is transmitted from the first device to the second device via the network. The identification information of the first device transmitting the original multimedia content is transmitted to the second device together with property information of the original multimedia content. When a plurality of result data are expected to be acquired by performing a corresponding shared function in the second device, types of result data may be designated and information regarding thereto may be transmitted to the second device together with the original multimedia content.

Figure 7:
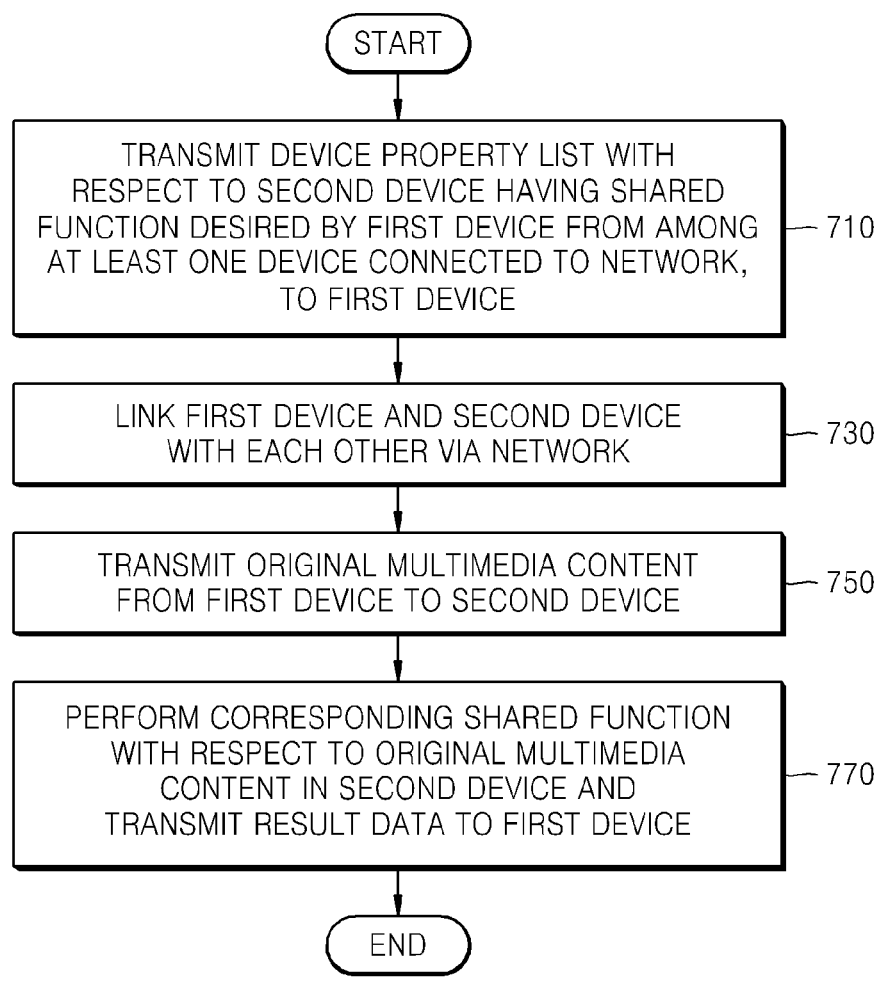
FIG. 7 illustrates a method of performing a shared function requested by an external device, from among methods of sharing functions via a network according to an embodiment of the present invention.

FIG. 7 illustrates a method of performing a shared function requested by an external device, from among methods of sharing functions via a network according to an embodiment of the present invention.

In an operation 710, when a signal for searching for a device having a shared function desired by a first device from among at least one device connected to a network, a device property list with respect to the second device having a shared function desired by the first device, is transmitted to the first device via the network. A relay device may be arranged between each device connected to the network, and may generate or update a device property list with respect to each device and provide the device property list to the first device when the first device requests the device property list. In particular, when the first device sets up detailed options related to a shared function desired by the first device, the relay device may extract a property list of a device closest to the detailed options and may provide the extracted property list to the first device.

In an operation 730, the first device is linked with the second device via the network. Specifically, after the first device selects the second device, the first device requests link to the second device, and the second device authorizes the request when a corresponding shared function is currently not being performed. The second device may authorize the request though a corresponding shared function is currently being performed.

In an operation 750, original multimedia content is transmitted from the first device to the second device via the network. The identification information of the first device transmitting the original multimedia content is transmitted to the second device together with property information of the original multimedia content. When a plurality of result data are expected to be acquired by performing a corresponding shared function in the second device, types of result data may be designated and information regarding thereto may be transmitted to the second device together with the original multimedia content.

In an operation 770, the second device performs a corresponding shared function with respect to the original multimedia content and transmits result data to the first device. The second device may perform the corresponding shared function in correspondence to types of result data designated by information received together with the original multimedia content.

The embodiments of the present invention can be written as computer programs and can be implemented in general-use digital computers that execute the programs using a computer readable recording medium. Examples of the computer readable recording medium include magnetic storage media (such as Read Only Memory (ROM), floppy disks, and hard disks), optical recording media (such as Compact Disc (CD)-ROMs or Digital Video Discs (DVDs)), etc.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of sharing a function between devices via a network, the method comprising:
    transmitting, by a second device, in response to a selection by a first device, of the second device capable of performing at least one of an encoding function and a decoding function which is unavailable at the first device, from among devices connected to the network, a response to the first device for authorizing a linkage with the first device;
    receiving, by the second device, multimedia content which is unplayable by the first device based on an encoding incapability or a decoding incapability of the first device, via the linkage;
    processing the multimedia content by at least one of encoding and decoding the multimedia content to enable the first device to play the processed multimedia content; and
    transmitting result data comprising the processed multimedia content to the first device via the linkage.

2. The method of claim 1, wherein the processed multimedia content provides a format supported by the first device.

3. The method of claim 1, wherein receiving the multimedia content comprises receiving identification of the first device with the multimedia content.

4. The method of claim 1, further comprising:
    providing, to the first device, information of a shared function indicating that the multimedia content can be processed at the second device.

5. The method of claim 1, wherein the result data is generated by combining a transport stream with the processed multimedia content.

6. An apparatus for sharing a function between devices via a network, the apparatus comprising:
    a transceiver configured to transmit, in response to a selection by a first device, of the apparatus capable of performing at least one of an encoding function and a decoding function which is unavailable at the first device, from among devices connected to the network, a response to the first device for authorizing a linkage with the first device based on an encoding incapability or a decoding incapability of the first device, and to receive multimedia content which is unplayable by the first device via the linkage; and a processor configured to process the multimedia content by at least one of encoding and decoding the multimedia content to enable the first device to play the processed multimedia content, wherein the transceiver is further configured to transmit result data comprising the processed multimedia content to the first device via the linkage.

7. The apparatus of claim 6, wherein the processor is further configured to perform a shared function in correspondence to types of result data to be acquired by performing the shared function as defined in information received together with the multimedia content.

8. The apparatus of claim 6, wherein the processed multimedia content provides a format supported by the first device.

9. The apparatus of claim 6, wherein the transceiver is further configured to receive identification of the first device with the multimedia content.

10. The apparatus of claim 6, wherein the transceiver is further configured to provide, to the first device, information of a shared function indicating that the multimedia content can be processed at the apparatus.

11. The apparatus of claim 6, wherein the result data is generated by combining a transport stream with the processed multimedia content.

12. A non-transitory computer readable recording medium having recorded thereon a computer program for implementing a method of sharing a function between devices via a network, the method comprising:

transmitting, by a second device, in response to a selection by a first device, of the second device capable of performing at least one of an encoding function and a decoding function which is unavailable at the first device, from among devices connected to the network, a response to the first device for authorizing a linkage with the first device;

receiving, by the second device, multimedia content which is unplayable by the first device based on an encoding incapability or a decoding incapability of the first device, via the linkage;

processing the multimedia content by at least one of encoding and decoding the multimedia content to enable the first device to play the processed multimedia content; and transmitting result data comprising the processed multimedia content to the first device via the linkage.

* * * * *